United States Patent

Matsumoto et al.

(10) Patent No.: US 9,164,321 B2
(45) Date of Patent: Oct. 20, 2015

(54) LIQUID CRYSTAL DISPLAY DEVICE

(71) Applicant: Japan Display Inc., Tokyo (JP)

(72) Inventors: Shohei Matsumoto, Tokyo (JP); Eiji Oohira, Tokyo (JP)

(73) Assignee: Japan Display Inc., Tokyo (JP)

( * ) Notice: Subject to any disclaimer, the term of this patent is extended or adjusted under 35 U.S.C. 154(b) by 35 days.

(21) Appl. No.: 14/087,193

(22) Filed: Nov. 22, 2013

(65) Prior Publication Data

US 2014/0176870 A1    Jun. 26, 2014

(30) Foreign Application Priority Data

Dec. 25, 2012 (JP) .................. 2012-280907

(51) Int. Cl.
*G02F 1/1335* (2006.01)
*G02F 1/1333* (2006.01)

(52) U.S. Cl.
CPC .... *G02F 1/133615* (2013.01); *G02F 1/133308* (2013.01); *G02F 2001/133314* (2013.01); *G02F 2202/28* (2013.01)

(58) Field of Classification Search
CPC .............. G02F 1/133308; G02F 1/133615; G02F 1/133608; G02F 1/1333; G02F 1/1335; G02F 1/133504; G02F 1/133528; G02F 1/1336; G02F 1/133603; G02F 1/133524; G02F 1/1339; G02F 2001/133317; G02F 2001/133325; G02F 2001/133322; G02F 2201/46; G02F 2202/28; G02B 6/0088; G02B 6/0073; G02B 6/0046; G02B 6/0028; G02B 6/0038; G02B 6/0081; G02B 6/0095; G06F 1/1601; G06F 1/1637
USPC ........ 349/58, 65, 122, 96, 153, 190; 362/633, 362/632, 19, 97.1, 97.3; 361/752, 753; 156/311

See application file for complete search history.

(56) References Cited

U.S. PATENT DOCUMENTS

2010/0053493 A1    3/2010  Kuwajima et al.
2014/0043558 A1*   2/2014  Hwang et al. ................... 349/58

FOREIGN PATENT DOCUMENTS

JP    2007-78912    3/2007
JP    2010-62016    3/2010

* cited by examiner

*Primary Examiner* — Thoi Duong
(74) *Attorney, Agent, or Firm* — Lowe Hauptman & Ham, LLP

(57) ABSTRACT

A liquid crystal display device includes a liquid crystal display panel and a backlight. The backlight includes a light guide plate arranged so as to overlap the liquid crystal display panel, an optical sheet arranged between the liquid crystal display panel and the light guide plate, a frame accommodating the light guide plate therein and facing a circumferential edge portion of the liquid crystal display panel, and an adhesive fixing the circumferential edge portion of the liquid crystal display panel to the frame. The frame includes a recess penetrating an outer side surface and an upper surface facing the circumferential edge portion of the liquid crystal display panel. The adhesive is arranged in the recess.

8 Claims, 10 Drawing Sheets

LIQUID CRYSTAL DISPLAY DEVICE

CROSS-REFERENCE TO RELATED APPLICATION

The present application claims priority from Japanese application JP2012-280907 filed on Dec. 25, 2012, the content of which is hereby incorporated by reference into this application.

BACKGROUND OF THE INVENTION

1. Field of the Invention

The present invention relates to a liquid crystal display device.

2. Description of the Related Art

A backlight of a liquid crystal display device includes a light guide plate for converting a point light source to a surface light source. A plurality of light-emitting components are arranged in a line so as to face an edge surface of the light guide plate (JP 2010-62016 A). Light emitted from the light-emitting component as a point light source is incident on the edge surface of the light guide plate, and emitted by reflection from a surface of the light guide plate to a liquid crystal display panel. The light-emitting components and the light guide plate are accommodated in a frame. Such a backlight is fixed by means of a double-faced tape in an area called a picture-frame that is located around an image display area of the liquid crystal display panel (JP 2007-78912 A).

Since the double-faced tape is formed by punching, there is a limit to a reduction in width and a predetermined width or more is necessary also for performing attaching work. In the market, a liquid crystal display panel whose picture-frame is narrow (a liquid crystal display panel having a narrow picture-frame) is strongly required. However, when the picture-frame of the liquid crystal display panel is narrowed, an area for attaching the double-faced tape is not secured in the liquid crystal display panel, leading to a problem that the backlight and the liquid crystal display panel cannot be fixed to and integrated with each other.

SUMMARY OF THE INVENTION

It is an object of the invention to fix a backlight to a liquid crystal display panel having a narrow picture-frame.

(1) A liquid crystal display device according to an aspect of the invention includes: a liquid crystal display panel; and a backlight, wherein the backlight includes a light guide plate arranged so as to overlap the liquid crystal display panel, a frame accommodating the light guide plate therein and facing a circumferential edge portion of the liquid crystal display panel, and an adhesive fixing the circumferential edge portion of the liquid crystal display panel to the frame, the frame includes an upper surface facing the circumferential edge portion of the liquid crystal display panel, an outer side surface intersecting the upper surface, and a recess penetrating the upper surface and the outer side surface, and the adhesive is arranged in the recess. According to the aspect of the invention, since the adhesive is used, the liquid crystal display panel can be fixed to the frame without using a double-faced tape that needs to be punched. Moreover, since the recess in which the adhesive is arranged penetrates the outer side surface of the frame, the recess can be filled with the adhesive after arranging the liquid crystal display panel on the frame.

(2) In the liquid crystal display device according to (1), the liquid crystal display panel may include a polarizer, and the frame may be fixed to the polarizer via the adhesive.

(3) In the liquid crystal display device according to (1) or (2), the frame may include an inner side surface on the side opposite to the outer side surface, and the recess may be formed so as to avoid penetrating the inner side surface.

(4) In the liquid crystal display device according to any one of (1) to (3), the planar shape of the upper surface of the frame may include two facing sides, and the recess may be formed on each of the two facing sides of the upper surface.

(5) In the liquid crystal display device according to any one of (1) to (4), the recess may be formed such that in a depth direction from at least one of the outer side surface and the upper surface, the size of the recess in a direction orthogonal to the depth direction decreases.

(6) In the liquid crystal display device according to any one of (1) to (4), the recess may be formed such that in a depth direction from one surface of the outer side surface and the upper surface, the width of the recess in a direction orthogonal to the depth direction and parallel to the other surface that is different from the one surface gradually decreases.

(7) In the liquid crystal display device according to any one of (1) to (4), the recess may be formed such that in a depth direction from at least one of the outer side surface and the upper surface, the size of the recess in a direction orthogonal to the depth direction increases.

(8) In the liquid crystal display device according to any one of (1) to (4), the recess may be formed such that in a depth direction from one surface of the outer side surface and the upper surface, the width of the recess in a direction orthogonal to the depth direction and parallel to the other surface that is different from the one surface gradually increases.

(9) In the liquid crystal display device according to any one of (1) to (3), the recess may be formed in the upper surface so as to extend in a direction along the outer shape of the liquid crystal display panel.

(10) In the liquid crystal display device according to any one of (1) to (3), the recess may be formed in the upper surface and the outer side surface so as to extend in a direction along the outer shape of the liquid crystal display panel.

(11) In the liquid crystal display device according to (1) or (2), the frame may include an inner side surface on the side opposite to the outer side surface, and the recess may be formed of a first portion penetrating from the outer side surface to the inner side surface and a second portion intersecting the first portion and formed in a groove shape in the upper surface so as to extend in a direction along the outer shape of the liquid crystal display panel.

(12) In the liquid crystal display device according to any one of (1) to (11), the upper surface and the liquid crystal display panel may be in direct contact with each other.

DETAILED DESCRIPTION OF THE INVENTION

Hereinafter, an embodiment of the invention will be described with reference to the drawings.

Figure 1:
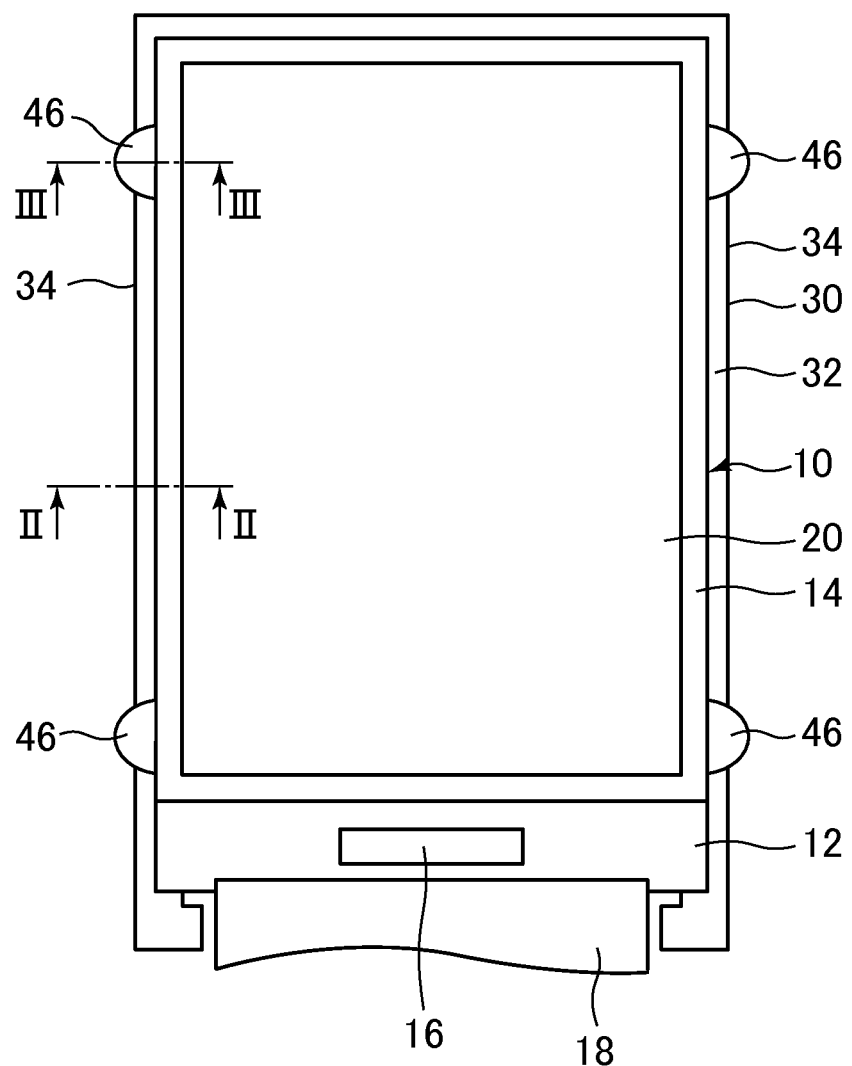
FIG. 1 is a plan view showing a liquid crystal display device according to an embodiment of the invention.
Figure 2:
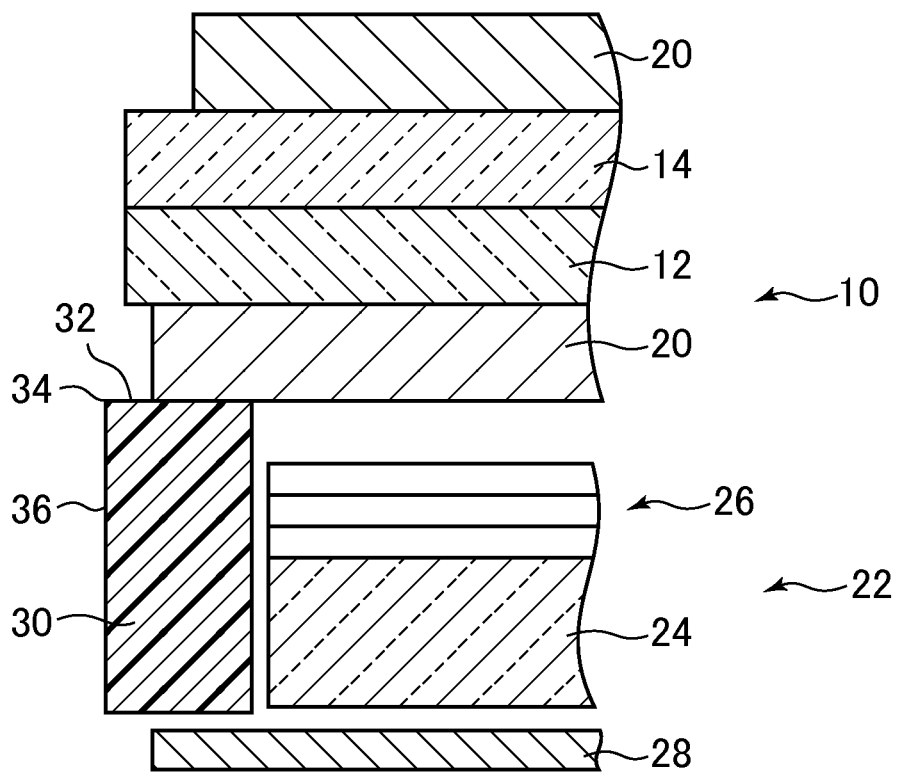
FIG. 2 is a cross-sectional view of the liquid crystal display device shown in FIG. 1, taken along line II-II.

FIG. 1 is a plan view showing a liquid crystal display device according to the embodiment of the invention. FIG. 2 is a cross-sectional view of the liquid crystal display device shown in FIG. 1, taken along line II-II.

The liquid crystal display device includes a liquid crystal display panel 10. The liquid crystal display panel 10 includes a pair of substrates 12 and 14 (both of which are glass substrates, for example) between which liquid crystal (not shown) is present. The substrate 12 is a TFT (Thin Film Transistor) substrate (or an array substrate) including thin film transistors, pixel electrodes, and wires (all of which are not shown), while the substrate 14 is a color filter substrate on which color filters (not shown) are formed. The substrate 12 includes a protruding portion protruding from the substrate 14. On the liquid crystal display panel 10 (specifically the protruding portion), an integrated circuit chip 16 incorporating therein a driver circuit for driving the liquid crystal is mounted. A flexible wiring board 18 for external electrical connection is attached to the protruding portion. The liquid crystal display panel 10 includes polarizers 20. The polarizers 20 are attached respectively to the pair of substrates 12 and 14.

The liquid crystal display device includes, for example, an edge-light type backlight 22. The backlight 22 includes a light guide plate 24. The light guide plate 24 is arranged so as to overlap the liquid crystal display panel 10. A surface of the light guide plate 24 faces a rear surface of the liquid crystal display panel 10. The light guide plate 24 is arranged on the rear surface side of the liquid crystal display panel 10 while avoiding a lower edge of the liquid crystal display panel 10. A plurality of light-emitting components (not shown) such as light-emitting diodes are arranged in a line so as to face an edge surface of the light guide plate 24. The light-emitting component is a point light source for introducing light into the light guide plate 24. Light from the point light source is converted by the light guide plate 24 into a surface light source and emitted on the liquid crystal display panel 10.

Between the liquid crystal display panel 10 and the light guide plate 24, an optical sheet 26 is arranged. The optical sheet 26 includes a diffusion sheet and a prism sheet. A reflective sheet 28 is arranged below the light guide plate 24 (on the side opposite to the optical sheet 26).

The backlight 22 includes a frame 30 made of, for example, a resin. The frame 30 accommodates the light guide plate 24 therein. The liquid crystal display panel 10 is attached to the frame 30. The frame 30 faces a circumferential edge portion (for example, an edge portion of the polarizer 20) of the liquid crystal display panel 10. The planar shape of an upper surface 32 of the frame 30 includes two facing sides 34 as shown in FIG. 1.

Figure 3:
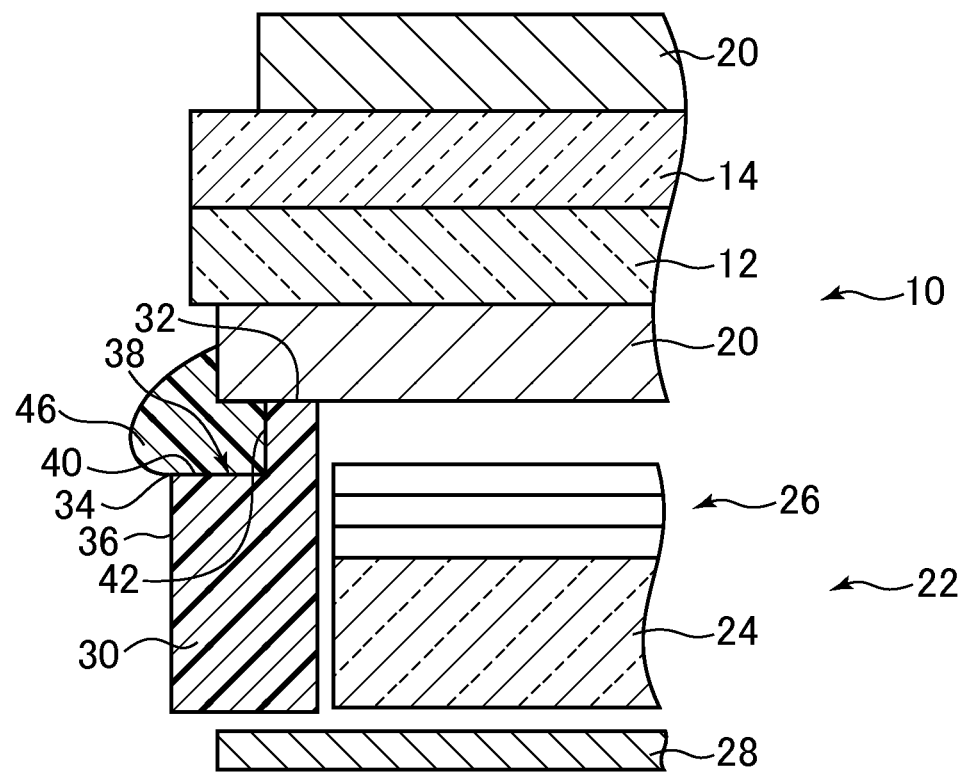
FIG. 3 is a cross-sectional view of the liquid crystal display device shown in FIG. 1, taken along line III-III.

FIG. 3 is a cross-sectional view of the liquid crystal display device shown in FIG. 1, taken along line III-III. The frame 30 includes recesses 38 penetrating an outer side surface 36 and the upper surface 32 that faces the circumferential edge portion of the liquid crystal display panel 10. The recesses 38 are formed on each of the two facing sides 34 (refer to FIG. 1) in the upper surface 32 of the frame 30. For example, a pair of the recesses 38 are formed spaced apart from each other on one side 34.

Figure 4:
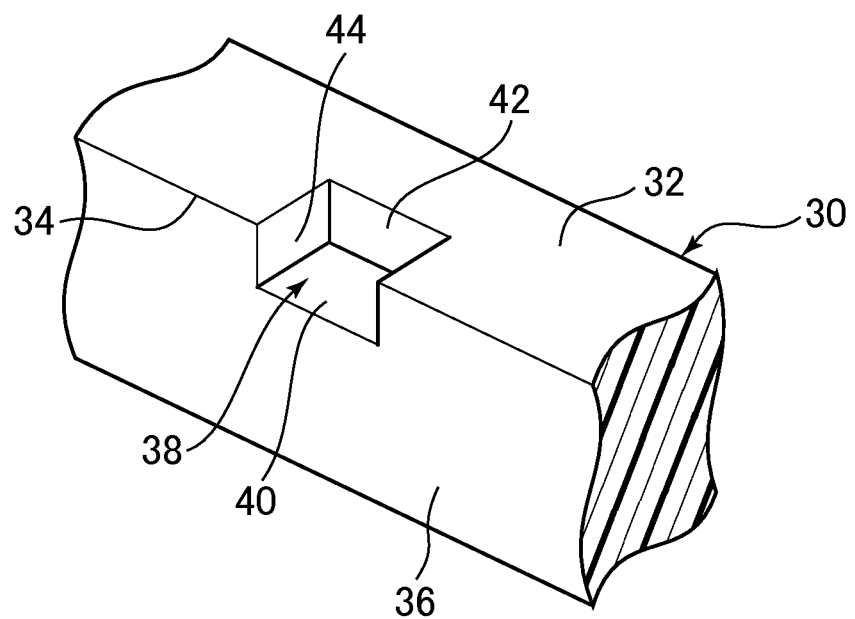
FIG. 4 is a perspective view showing a recess of a frame.

FIG. 4 is a perspective view showing the recess 38 of the frame 30. The recess 38 is formed in the outer side surface 36 of the frame 30 so as to be cut out from an upper edge adjacent to the upper surface 32. The recess 38 is formed so as to avoid penetrating an inner side surface on the side opposite to the outer side surface 36. The shape of the recess 38 presented in the outer side surface 36 is rectangular. Moreover, the recess 38 is formed in the upper surface 32 of the frame 30 so as to be cut out from a side edge adjacent to the outer side surface 36. The shape of the recess 38 presented in the upper surface 32 is rectangular. The recess 38 includes an upper bottom surface 40 facing in the same direction as the upper surface 32 (a bottom surface in a depth direction from the upper surface 32), a side bottom surface 42 facing in the same direction as the outer side surface 36 (a bottom surface in a depth direction from the outer side surface 36), and inner edge surfaces 44 intersecting the upper bottom surface 40 and the side bottom surface 42. The upper bottom surface 40, the side bottom surface 42, and the inner edge surfaces 44 are arranged so as to be at right angles to each other.

The circumferential edge portion of the liquid crystal display panel 10 (for example, the polarizer 20) and the frame 30 are fixed by means of an adhesive 46. The adhesive 46 is arranged in the recess 38 of the frame 30. The adhesive 46 adheres to the liquid crystal display panel 10 (for example, the polarizer 20) and the inner surfaces of the recess 38 of the frame 30. As shown in FIG. 3, the adhesive 46 may be disposed so as to protrude outward from the outer side surface 36 of the frame 30. Moreover, the adhesive 46 may be disposed so as to adhere to a circumferential edge surface of the liquid crystal display panel 10 (for example, the polarizer 20).

According to the embodiment, since the adhesive 46 is used, the liquid crystal display panel 10 can be fixed to the frame 30 without using a double-faced tape that needs to be punched. That is, even when an area for arranging a double-faced tape cannot be secured due to the liquid crystal display panel 10 having a narrow picture-frame, the liquid crystal display panel 10 and the backlight 22 can be fixed to and integrated with each other. Moreover, since the recess 38 in which the adhesive 46 is arranged penetrates the outer side surface 36 of the frame 30, the recess 38 can be filled with the adhesive 46 after arranging the liquid crystal display panel 10 on the frame 30. Since there is no need to use a double-faced tape as described above, the upper surface 32 of the frame 30 (in other words, the uppermost surface of the frame 30) and the liquid crystal display panel 10 may be in direct face-to-face contact with each other as shown in FIG. 2.

Figure 5:
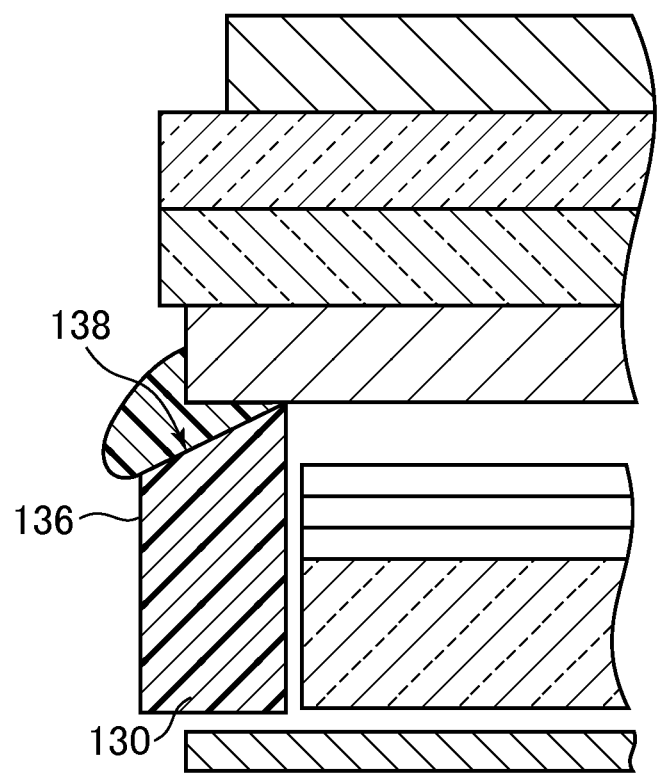
FIG. 5 is a cross-sectional view for explaining Modified Example 1 of the liquid crystal display device according to the embodiment of the invention.

FIG. 5 is a cross-sectional view for explaining Modified Example 1 of the liquid crystal display device according to the embodiment of the invention. This example differs from the embodiment in that a bottom surface of a recess 138 in a depth direction from an upper surface 132 of a frame 130 is inclined.

Figure 6:
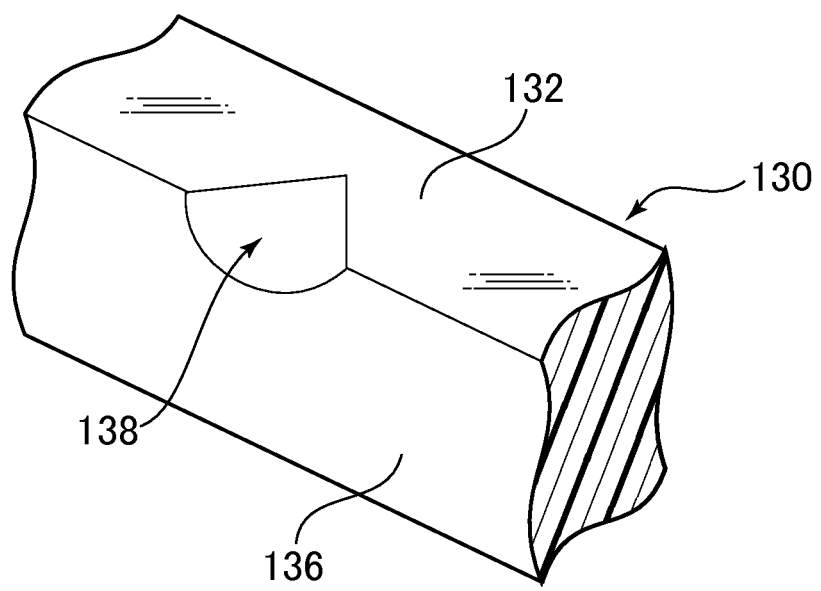
FIG. 6 is a perspective view showing a recess according to Modified Example 1.

FIG. 6 is a perspective view showing the recess 138 according to Modified Example 1. The bottom surface of the recess 138 is presented in an outer side surface 136 so as to be formed in an arch. The recess 138 is formed such that in a depth direction from the outer side surface 136 of the frame 130, the size of the recess in a direction orthogonal to the depth direction decreases (the width of the recess 138 in the direction orthogonal to the depth direction and parallel to the upper surface 132 gradually decreases). Therefore, the recess 138 is presented in the upper surface 132 so as to be formed in a triangle. Alternatively, although not shown in the drawing, the recess may be formed such that in the depth direction from the upper surface 132 of the frame 130, the size of the recess in the direction orthogonal to the depth direction decreases (the width of the recess 138 in the direction orthogonal to the depth direction and parallel to the outer side surface 136 gradually decreases), or that in the depth directions from both the upper surface 132 and the outer side surface 136 of the frame 130, the size of the recess in the direction orthogonal to the depth directions decreases.

Figure 7:
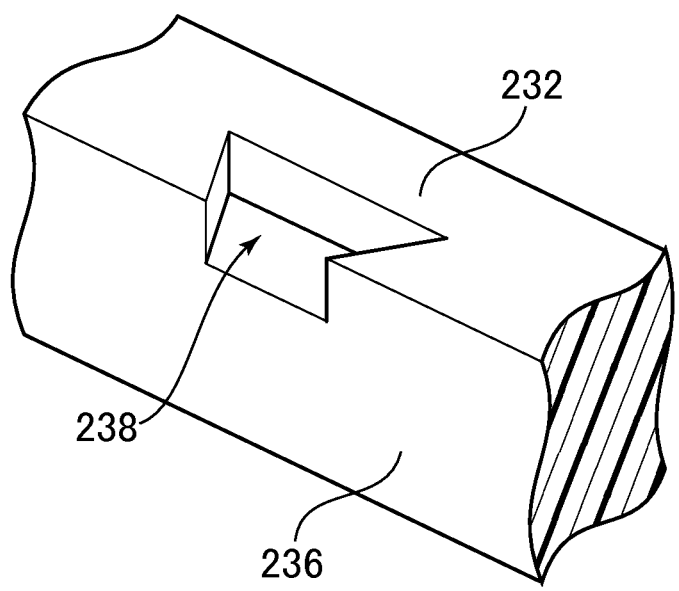
FIG. 7 is a perspective view showing a recess according to Modified Example 2 of the embodiment of the invention.

FIG. 7 is a perspective view showing a recess 238 according to Modified Example 2 of the embodiment of the invention. In this example, the recess 238 is formed such that in a depth direction from an outer side surface 236, the size of the recess in a direction orthogonal to the depth direction increases (the width of the recess 238 in the direction orthogonal to the depth direction and parallel to an upper surface 232 gradually increases). Therefore, the recess 238 is presented in the upper surface 232 so as to be formed in a trapezoid. Specifically, in the trapezoid presented in the upper surface 232, an upper base located at an outer edge adjacent to the outer side surface 236 is shorter than a lower base on the opposite side. Alternatively, although not shown in the drawing, the recess may be formed such that in a depth direction from the upper surface 232, the size of the recess in a direction orthogonal to the depth direction increases (the width of the recess 238 in the direction orthogonal to the depth direction and parallel to the outer side surface 236 gradually increases), or that in the depth directions from the upper surface 232 and the outer side surface 236, the size of the recess in the direction orthogonal to the depth directions increases.

Figure 8:
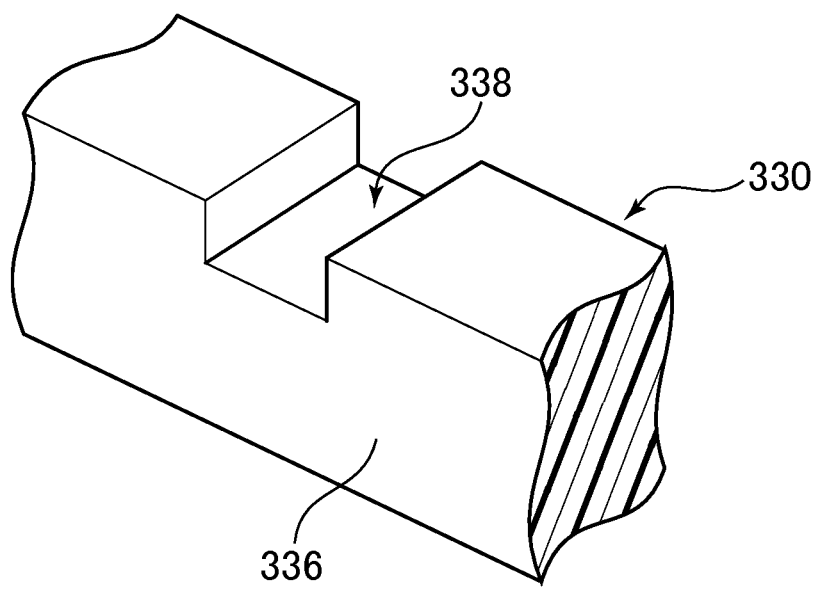
FIG. 8 is a perspective view showing a recess according to Modified Example 3 of the embodiment of the invention.

FIG. 8 is a perspective view showing a recess 338 according to Modified Example 3 of the embodiment of the invention. In this example, the recess 338 is formed so as to penetrate an inner side surface opposite to an outer side surface 336. Also in this example, since the recess 338 penetrates the outer side surface 336 of a frame 330, the recess 338 can be filled with the adhesive after arranging the liquid crystal display panel on the frame 330.

Figure 9:
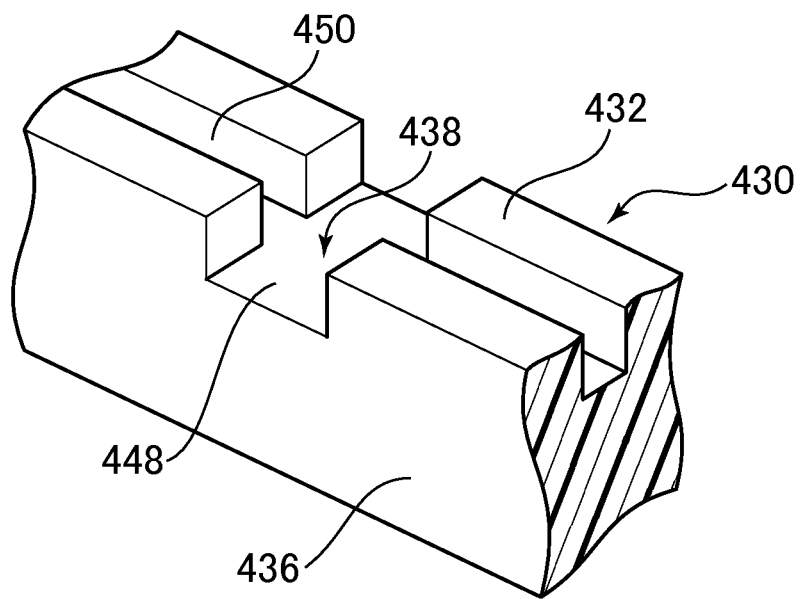
FIG. 9 is a perspective view showing a recess according to Modified Example 4 of the embodiment of the invention.

FIG. 9 is a perspective view showing a recess 438 according to Modified Example 4 of the embodiment of the invention. In this example, the recess 438 includes an opening 448 penetrating from an outer side surface 436 of a frame 430 to an inner side surface thereof on the opposite side, and a portion (that is, a groove 450) formed in an upper surface 432 and extending in a direction along the outer shape of the liquid crystal display panel 10 (refer to FIG. 1). The groove 450 intersects the opening 448. The recess 438 shown in FIG. 9 is obtained by combining the recess 338 shown in FIG. 8 with the groove 450. However, the groove 450 can be combined with the embodiment or the other modified examples. For example, the groove 450 may be combined with the recess 38 not penetrating an inner side surface shown in FIG. 4.

Figure 10:
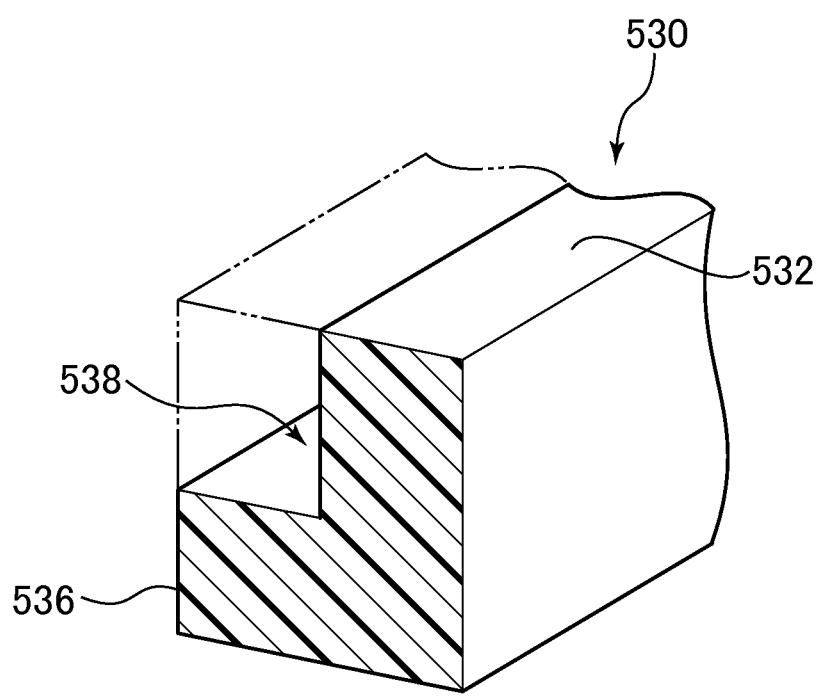
FIG. 10 is a perspective view showing a recess according to Modified Example 5 of the embodiment of the invention.

FIG. 10 is a perspective view showing a recess 538 according to Modified Example 5 of the embodiment of the invention. In this example, the recess 538 is formed in both an upper surface 532 and an outer side surface 536 so as to extend in the direction along the outer shape of the liquid crystal display panel 10 (refer to FIG. 1). That is, the recess 538 is formed by continuously cutting out a connection portion (indicated by two-dot chain lines) of the upper surface 532 and the outer side surface 536 along the outer shape of the liquid crystal display panel 10. Also in this example, since the recess 538 penetrates the outer side surface 536 of a frame 530, the recess 538 can be filled with the adhesive after arranging the liquid crystal display panel 10 on the frame 530.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A liquid crystal display device comprising:
   a liquid crystal display panel; and
   a backlight,
   wherein
   the backlight includes
      a light guide plate arranged so as to overlap the liquid crystal display panel,
      a frame accommodating the light guide plate therein and facing a circumferential edge portion of the liquid crystal display panel, and
      an adhesive fixing the circumferential edge portion of the liquid crystal display panel to the frame,
   the frame includes
      an upper surface facing the circumferential edge portion of the liquid crystal display panel, the upper surface having a planar shape which includes two facing sides,
      an outer side surface intersecting the upper surface at each of the two facing sides, and
      a recess penetrating the upper surface and the outer side surface, formed on each of the two facing sides of the upper surface, and
   the adhesive is arranged in the recess.

2. The liquid crystal display device according to claim 1, wherein
   the liquid crystal display panel includes a polarizer, and
   the frame is fixed to the polarizer via the adhesive.

3. The liquid crystal display device according to claim 1, wherein
   the frame further includes an inner side surface on the side opposite to the outer side surface, and
   the recess is formed so as to avoid penetrating the inner side surface.

4. The liquid crystal display device according to claim 1, wherein
   the recess is formed such that in a depth direction from at least one of the outer side surface and the upper surface, the size of the recess in a direction orthogonal to the depth direction decreases.

5. The liquid crystal display device according to claim 1, wherein
   the recess is formed such that in a depth direction from one surface of the outer side surface and the upper surface, the width of the recess in a direction orthogonal to the depth direction and parallel to the other surface that is different from the one surface gradually decreases.

6. The liquid crystal display device according to claim 1, wherein
   the recess is formed such that in a depth direction from at least one of the outer side surface and the upper surface, the size of the recess in a direction orthogonal to the depth direction increases.

7. The liquid crystal display device according to claim 1, wherein
   the recess is formed such that in a depth direction from one surface of the outer side surface and the upper surface, the width of the recess in a direction orthogonal to the depth direction and parallel to the other surface that is different from the one surface gradually increases.

8. The liquid crystal display device according to claim 1, wherein the upper surface and the liquid crystal display panel are in direct contact with each other.

* * * * *